United States Patent [19]

Büchler, deceased

[11] Patent Number: 5,237,146
[45] Date of Patent: Aug. 17, 1993

[54] DEVICE FOR FASTENING AN ARTICLE, DISPOSED AT AN END OF A CYLINDRICAL SHAFT, AT A COUPLING MEMBER OF A COUPLING MEANS

[75] Inventor: Rene Büchler, deceased, late of Oberbühren, Switzerland, by Elsy Büchler, Marcel Büchler, Reto René Buchler, heirs

[73] Assignee: Buchler B-SET AG, Flawil, Fed. Rep. of Germany

[21] Appl. No.: 474,000

[22] PCT Filed: Aug. 18, 1989

[86] PCT No.: PCT/EP88/00976
§ 371 Date: Sep. 3, 1991
§ 102(e) Date: Sep. 3, 1991

[87] PCT Pub. No.: WO90/02014
PCT Pub. Date: Mar. 8, 1990

[30] Foreign Application Priority Data
Aug. 19, 1988 [DE] Fed. Rep. of Germany ....... 3828239

[51] Int. Cl.⁵ .......................... B23H 1/04; B23H 7/26
[52] U.S. Cl. .................................. 219/69.15; 403/14; 403/330
[58] Field of Search .................. 219/69.11, 69.15; 403/13, 14, 361, 330; 279/15, 77; 408/56, 59

[56] References Cited

U.S. PATENT DOCUMENTS

| | | | |
|---|---|---|---|
| 3,625,554 | 12/1971 | Mottais et al. | 403/14 |
| 4,879,930 | 11/1989 | Von Haas | 403/13 |

FOREIGN PATENT DOCUMENTS

| | | | |
|---|---|---|---|
| 2646951 | 3/1982 | Fed. Rep. of Germany. | |
| 3335022 | 4/1985 | Fed. Rep. of Germany. | |
| 3706123 | 9/1988 | Fed. Rep. of Germany. | |
| 163026 | 10/1982 | Japan | 219/69.15 |
| 61-86129 | 5/1986 | Japan | 219/69.15 |
| 1159 | of 1915 | United Kingdom. | |

Primary Examiner—Geoffrey S. Evans
Attorney, Agent, or Firm—Cushman, Darby & Cushman

[57] ABSTRACT

A device for fastening an article, disposed at an end of a cylindrical shaft, portion, to one coupling member of a coupling means whose other coupling member is anchored at a machine tool, especially a die sinking electric discharge machine. One coupling member includes a bore to receive the shaft portion. An intermediate piece consisting of a shaft portion and a fixing portion is made in one-piece, preferably by an aluminum casting process. The fixing portion is adapted for engagement with an interlocking means disposed at the wall of a take-up sleeve of the coupling member. Likewise provided is a one-piece bushing to take up a shank of an article the outer surface of the bushing at least in part being in engagement with the inner surface of the hollow end remote from the coupling member of the cylindrical shaft.

23 Claims, 2 Drawing Sheets

DEVICE FOR FASTENING AN ARTICLE, DISPOSED AT AN END OF A CYLINDRICAL SHAFT, AT A COUPLING MEMBER OF A COUPLING MEANS

BACKGROUND OF THE INVENTION

The invention relates to a device for fastening an article, disposed at an end of a cylindrical shaft portion, to one coupling member of a coupling means whose other coupling member is anchored at a machine tool, especially a die sinking electric discharge machine, the one coupling member comprising a bore to take up the shaft portion.

The applicant's earlier German patent application DE-P 37 06 123 discloses a device for connecting a shaft which carries a sinker electrode to a coupling member which is anchored at a machine tool, especially a die sinking spark erosion machine, and has a conical recess converging from the opening toward the coupling face.

A split insert bushing is provided within the recess and has its inner surface adapted to the outer contour of the shaft so as to press together the coupling member and the shaft.

Furthermore, a fastening means for tools in spark erosion machinery is known from DE-PS 26 46 951. Here, a shaft to be clamped in a chuck is provided with a radially projecting pin which is adapted to be pressed by a spring loaded tensioning member against the end face of the take-up part of the shaft and against a bolt protruding from the take-up part in parallel with the shaft.

The abutment of the pin against the end face of the chuck provides fixation in height and the abutment of the pin against the bolt fixes the angular position. This fastening means, however, has the disadvantage that, for abutment and fixation in height, the pin must be fitted on the shaft, i.e. must be shrunk and/or secured by a grub screw, in other words mounted on the shaft as an additional component part. Furthermore, in that case the electrode is soldered to the shaft and that is expensive in terms of work to be done and further results in the electrode becoming loose from the shaft upon heating.

SUMMARY OF THE INVENTION

It is the object of the invention to warrant simple handling of the article to be fastened by the chuck and shaft in a device of the generic kind specified and, at the same time, provide high repetition accuracy without the influence of manual contact pressures. Moreover, production of the device is to be simple and inexpensive.

This object is met, with a device of the kind defined in claim 1. Advantageous modifications and further developments of the invention are to be gathered from the dependent claims.

The solution of the invention makes it possible to use sinker electrodes which are fixed on standard shafts, partly in exchange. The electrodes can be replaced in a simple way and within a short time. It is particularly advantageous that the expensive fixing by soldering of the electrode on the shaft end is dispensed with.

The fixing portion being an integral component of the intermediate piece by being molded as part of the shaft thereof, additional parts can be avoided which usually give rise to further inaccuracies in the setting and fastening of the shaft for being mounted at the job site.

The molding of the fixing portion as an integral component of the intermediate piece further permits cost reduction in the manufacture of the shaft portion as the necessary shafts are produced by die casting and but one die is needed for the intermediate piece according to the invention that includes the shaft.

In view of the fact that the bushing is designed as a single piece, the tools can be mounted rapidly and firmly at the hollow cylindrical end of the shaft and can be exchanged just as easily. The interlocking provides precise and reproducible contact pressure between the take-up sleeve and the intermediate piece and this contact pressure is totally independent of any manual contact pressures exerted upon introducing the intermediate piece into the take-up sleeve. This also improves and guarantees the repetition accuracy.

With a preferred embodiment, the fixing portion of the intermediate piece has a curved configuration with a curvature at one side, with another embodiment it has an angular cross section. The end face of the wall of the take-up sleeve of the second coupling member is formed with a groove. In a preferred embodiment this groove is wedge-shaped but, with inclined sidewalls, it may also include an additional horizontal bottom section. In this manner the fixing portion may engage the surfaces of the groove in line contact or in narrow surface area contact, whereby the respective desired fixing in height is obtained. Without vertically moving the intermediate piece, it is thus no longer possible to rotate the intermediate piece inside the cylindrical bore of the respective coupling member once the fixing portion is in its position of engagement in the groove.

In a preferred embodiment of the invention the interlocking means is adapted to be rotated or turned and the respective fixing portion can be engaged with the interlocking means only after having been received in the groove. This design of the interlocking means permits quick and firm locking of the fixing portion engaged in line contact in the groove. That provides the required angular fixing.

The firm position of the fixing portion in the groove, on the one hand, and the corresponding locked engagement, at the same time, have the effect that both the fixing portion and the shaft lie against the walls of the coupling member by respective differently oriented reference surfaces. This simultaneous vertical and horizontal engagement of corresponding surfaces or lines of contact provides a rigid and firm position of the shaft in the take-up member in quick and simple manner when fastening the intermediate piece. Undesired tilting movements of the shaft portion are avoided by this positioning. The abutting surfaces or the areas of the lines of engagement at the coupling member serve as reference areas for the adjustment.

Advantageous modifications of the teaching according to the invention show an interlocking means in the form of a hook. The stability thereof is clearly improved by a thrust bearing adapted for engagement with the hook.

With another realization of the teaching according to the invention the one-piece bushing has a central circular opening of smaller diameter than the diameter of the smallest cylinder which is defined by the inner surface of the walls and the axis of which is coaxially aligned with the axis of the one-piece bushing. That makes it possible to attach an auxiliary tool by screwing it into a threaded bore in the coupling member in order to force out the tool or workpiece which is pressed into the one end of the cylindrical shaft portion and which may be a sinker electrode, for example. (The term sinker electrode as used hereinafter is to serve as an example of a tool or workpiece.) Sinker electrodes thus can be exchanged rapidly any time; the risk of seizing by the pressed-in sinker electrode and the concomitant disturbance of the entire working process can be reduced hereby.

With another embodiment according to the invention the outer surface of the wall of the one-piece bushing is of conical outline and the inner surfaces of the wall define a cylindrical inner space adapted to receive the end to be clamped of a cylindrical fixing portion of the respective tool which thus is adapted to be pressed together with the one-piece bushing into the hollow cylindrical or conical inner end of the shaft portion. This possible clamping of the tool by means of the bushing in the hollow cylindrical or conical shaft end permits quick centering of the tool for the working process. This way of fastening the tool at the shaft makes it superfluous to secure the tool, in the instant case an electrode, by an expensive soldering procedure at the end face of the shaft. The self-locking clamping by means of the bushing no longer requires such precise handling by the operators in fastening the electrode to the shaft as was needed with the soldering of the electrode to the shaft.

Another embodiment according to the invention comprises an inner space of a configuration which differs from the cylindrical form so as to afford the advantage of being fit to take up tool fastening sections of different outlines.

In the case of another embodiment according to the invention the outer surface of the wall of the one-piece bushing is formed with radially projecting fins. With another advantageous embodiment such fins are located at the inner surfaces of the wall of the one-piece bushing. In either case the pressure upon insertion can be increased which the inner surfaces of the shaft portion exert on the shank of the tool through the one-piece bushing during the pressing-in operation. If the shank of the tool has an outline that differs from the hollow cylindrical shape, it can be assured by means of the fins that the forces exerted by the tool shank on the inner surfaces of the walls, which forces are not necessarily the same at all locations, still establish areas of contact between the one-piece bushing and the inner surfaces of the shaft portion by way of the fins in order for the tool to be retained in the shaft portion by means of the one-piece bushing once it has been pressed in.

In the case of another embodiment according to the invention the one-piece bushing is made of elastically deformable material. The nestling of the one-piece bushing afforded by its elastic character permits the use specifically of standardized shanks of tools having small diameters since the recesses in the interior of the one-piece bushing can be realized more easily in the casting technique when the inner spaces are smaller.

With another embodiment according to the invention the one-piece bushing preferably is made of die cast aluminum. As the price of aluminum is very favorable, in this event the one-piece bushing can be used as a disposable article. The repetition accuracies otherwise required if bushings are used more than once need not be observed in the case of one-time use. In view of the fact that blanks rather than finished parts are being chucked the demands to be met are less in the processing of aluminum parts as the clamping members.

It is provided with further advantageous configurations of the one-piece bushing that it is conical in certain sections only so that engagement in the bore of the take-up sleeve is not established along the full outer surface. That produces higher surface area pressures and, therefore, higher deforming forces to give the bushing a plastic and/or elastic deformation. In the case of a variant embodiment the bushing consists of a plurality of conical segments which are connected to one another by resilient parts. It is only the conical segments which lie against the bore of the take-up sleeve. With another variant embodiment the bushing is formed in its outside contour with grooves which extend parallel to the central axis or with slits which pass through the "flesh" of the bushing all the way to the inner bore of the opening. The latter, however, do not extend for the full length of the bushing so that a closed ring is left at one end. The bushing further may have a cross sectional configuration which differs from the circular shape, such as the configuration of a polygon or a polygonal course, the conicity mentioned in longitudinal section not being affected thereby.

In the case of another modification of the invention the centering function for the Z axis is divided from the centering function in the X/Y axis. To accomplish that, the end face of the take-up sleeve is formed as a stop in Z direction, while the groove in the end face takes care only of the centering in X/Y direction or in the direction of rotation. Redundancy in static definition and the resulting inaccuracy are avoided by the resilient nature given the fixing portion which protrudes from the intermediate piece and the offsetting of the sidewalls of the groove with respect to the end face of the take-up sleeve, the sidewalls preferably taking a wedge-shaped course. In this manner, first the radially outer part of the fixing portion gets into contact with the sidewalls of the groove when the intermediate piece is inserted. Upon further insertion, effected by the force of the interlocking means, the intermediate piece is pushed ahead, while the fixing portion is being deformed elastically, until the radially inner section of the fixing portion hits the stop surface mentioned. As the centering function for the axes mentioned is split, greater accuracy is achieved in the chucking.

BRIEF DESCRIPTION OF THE DRAWING

The invention will be described further, by way of a preferred embodiment, with reference to the accompanying drawings, in which.

DETAILED DESCRIPTION OF THE INVENTION

Figure 1:
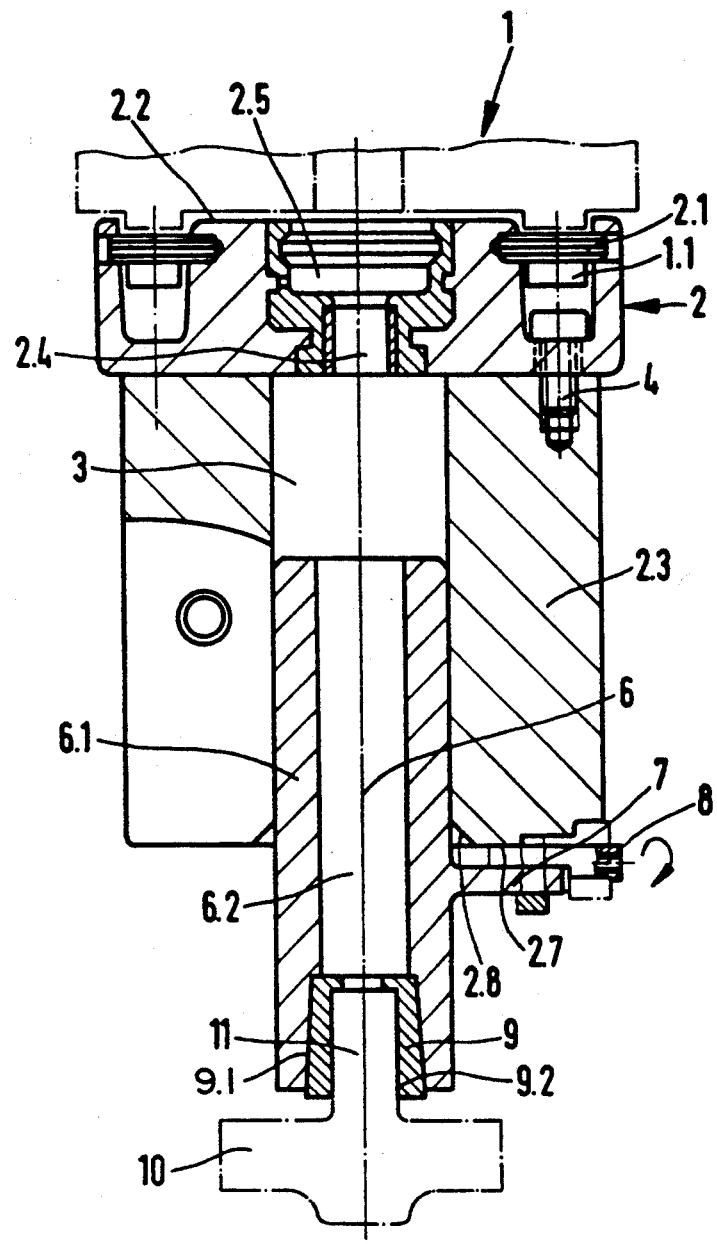
FIG. 1 presents an axial cut through a device according to the invention.

In FIG. 1 a first coupling member 1 indicated in dash-dot outline is anchored firmly in a die sinking electric discharge machine (not shown) which is being referred to here as an example of any desired machine tool. The coupling member comprises transmitting elements 1.1 which are elastically deformable to a limited extent and engaged by a rigid profiled element in the form of a cylindrical bolt 2.1 provided at the second coupling member 2 shown in continuous lines in a lower position. Relative movement between the two coupling members 1 and 2 in the main directions x, y, z in space is prevented.

A plurality of screws 4 fasten a take-up sleeve 2.3 at the side remote from the coupling surface 2.2 of the lower second coupling member 2 which can be manipulated freely when uncoupled. The inner cylindrical wall of the take-up sleeve 2.3 encompasses a bore 3 which is coaxial with the entire second coupling. cylindrical walls of the take-up sleeve 2.3 which are coaxial with the coupling member 2 and fixed directly to it. A threaded bore 2.4, coaxial with bore 3, is provided in second side of the coupling member 2 away from the coupling surface 2.2. A greater cylindrical bore 2.5 is to be seen in FIG. 1 as a continuation of the threaded bore 2.4. While the greater cylindrical bore 2.5 serves to receive a per se known means which achieves the mutual clamping of the two coupling members 1 and 2, the threaded bore 2.4 is provided to take up an auxiliary tool, not shown in the drawing, whose purpose is to force an intermediate piece, as yet to be explained, or the shank of a tool out of its pressed in position.

A hollow cylindrical shaft portion 6.1 of an intermediate piece 6 is introduced into the cylindrical bore 3, coaxially with the coupling member 2. The cylindrical bore 6.2 is enclosed in the shaft portion 6.1 coaxially with the second coupling member 2. A fixing portion 7 is formed integrally with the intermediate piece 6 at the shaft portion 6.1 so as to extend from the cylindrical outer surface of the shaft portion 6.1 of the intermediate piece 6 in a radial direction and substantially vertically with respect to the outer surface of the shaft portion 6.1.

The vertical movement of the cylindrical shaft portion 6.1 into the bore 3 is limited by the fixing portion 7 abutting against the end face 2.7, serving a stop in the Z direction, of the cylindrical wall of the take-up sleeve 2.3 of the second coupling member 2. Furthermore, chamfering 2.8 is provided in the area of the opening of the bore 3 to prevent the fixing portion 7 from abutting against the end face 2.7 by its radially innermost portion which is slightly rounded for reasons of manufacturing technique and stability. The end face 2.7 is formed with a groove 2.6, shown in detail in FIG. 3, so that the proper positioning of the interlocking means may be found as quickly as possible with the aid of the fixing portion 7. Additionally, the groove 2.6 limits the rotational movement of the fixing portion 7. The groove 2.6 is substantially wedge-shaped to receive the respective fixing portion in line contact. For fixing portions of special outline, the groove also comprises a horizontal bottom section.

The groove is located offset with respect to the end face 2.7 such that the fixing portion 7, on being introduced in the Z direction, first enters into contact with the sidewalls of the groove. When the intermediate piece is pushed in further, the radially inner part of the fixing portion 7 touches the end face 2.7, whereby the fixing portion 7 is deformed elastically. Because, the offset is very small, the elastic deformation of the fixing portion 7 is likewise minimal in the order of a few microns in magnitude.

An interlocking means 8, embodied by a hook in accordance with FIG. 1, is provided for further locking and inhibiting the movement of the fixing portion 7 with the cylindrical shaft portion 6.1. This rotatable hook and the movable mounting thereof at the cylindrical wall of the take-up sleeve 2.3 of the coupling member 2 will be explained further with reference to FIGS. 3 and 4.

A one-piece bushing 9 is inserted into the shaft portion 6.1 the end remote from the second coupling member 2. A stem or shank 11 of an article such as a tool 10, is firmly received in the interior of the bushing one-piece defined by the wall 9.2. The of which shank 11 of which serves for the usual retention of the tool 10. The part of the shank 11 which is remote from the tool 10 and preferably abuts against the horizontal bottom surface of the one-piece bushing 9 is enclosed all around by the one-piece bushing 9. Later on, the shank 11 can be removed from the one-piece bushing 9 through the central opening 9.1 and an auxiliary tool already mentioned.

The outer surface of the wall 9.2 of the one-piece bushing 9 essentially is of conical outline, whereas its inner surface comprises a hollow cylindrical inner space to take up the respective cylindrical shank 11. Of course, the space inside the one-piece bushing is not limited to cylindrical configurations, but is dependent on the shape of the shank 11. What is important is only that the inside wall surface of the one-piece bushing 9 is joined in force lock with the shank 11 of the tool 10. Because of the conical contour of the outer surface wall of the one-piece bushing 9 the shank 11 is subjected to ever greater pressure as it is pressed further into the end of the shaft portion 6.1 remote from the second coupling member 2. Because of their conical configuration, the outer walls 9.2 of the one-piece bushing 9 act like wedges.

In order to take advantage particularly of the conical effect of the conical outer surfaces of the one-piece bushing 9, the end of the intermediate piece remote from the second coupling member 2 likewise is formed conically inside. The adaptation in shape to the bushing 9 assures firm retention of the shank 10.

In addition, fins (not shown) may be provided on the outer surface as well as the inner surface of the one-piece bushing. When the shape of the shank 11 of the tool 10 is other than cylindrical, the fins may exert a certain additional compressive force from the inner surfaces of the hollow cylindrical shaft portion 6 through the one-piece bushing 9 on the shank 11.

Instead of providing fins, the outer surface may be designed as a polygon or a polygonal course whereby the compressive force likewise may be enhanced.

The one-piece bushing 9 is made of elastically and/or plastically deformable material because only then can it be pressed into the hollow end of the intermediate piece 6 when it has already received the shank 11. The tolerance within this elasticity preferably is very slight so that almost no error will occur in respect of the centering of the shank.

Figure 2:
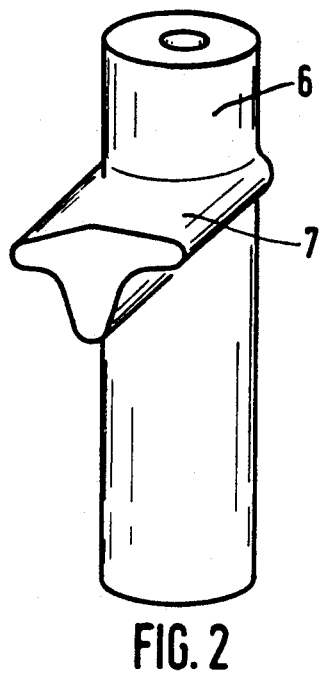
FIG. 2 shows the cylindrical shaft with the fixing portion which is of one-sided curvilinear shape.

FIG. 2 shows another possibility of fastening the fixing portion 7 at the cylindrical wall of the take-up sleeve 2.3 of the second coupling member 2. The shaft portion 6.1 of the intermediate piece 6 is received in the bore 3, as shown in FIG. 1. The fixing portion 7 is of curvilinear shape at one side, being roofed in cross section in T-fashion with rounded tips, and is molded integrally with the cylindrical shaft portion 6.1 to present a joint die cast intermediate piece 6. This fixing portion 7 is received, by a principle to be explained below in FIG. 3, in a groove 2.6 formed in the end face of the cylindrical wall of the take-up sleeve 2.3 of the second coupling member 2. The lower one-sidedly curved curvatures of the fixing portion 7 then will be in line contact with the reference surfaces of the groove 2.6. That limits and practically eliminates horizontal rotational movement of the intermediate piece 6. Tilting motions of the cylindrical shaft portion 6 in the bore 3 are excluded anyway because of the diameters selected. The ratio between chucking diameter and chucking depth can be increased in view of the given form lock, without deterioration of the chucking characteristics.

Figure 3:
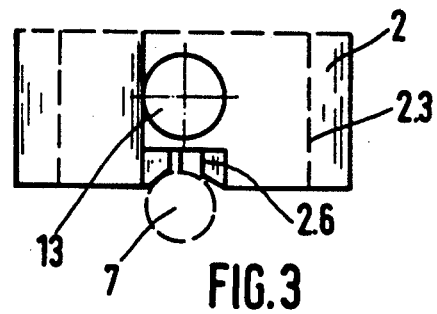
FIG. 3 shows a terminating part of the coupling member formed with a groove.
Figure 4:
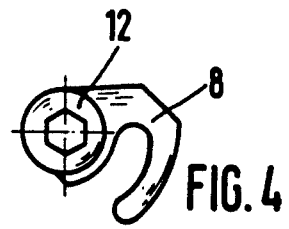
FIG. 4 is a lateral view of a hook-shaped interlocking means.

FIG. 3 shows the end portion of the cylindrical wall of the take-up sleeve 2.3 of the coupling second member 2 and the groove 2.6 being formed in the end face thereof. Once the fixing portion 7 being curved at one side is located in this groove 2.6, the only movement possible is vertically out of the groove 2.6. That movement is prevented, in the example according to FIG. 3, by a hook 8 which is shown in detail in FIG. 4. This hook 8 according to FIG. 4 has a curved slot, the distance between the slot sides being sufficient to receive the fixing portion 7. A spring loaded pin 12 is mounted vertically on the hook 8 and is introduced into a bore 13 in the coupling portion illustrated in FIG. 3. When the fixing portion 7 is fitted in form lock in the groove 2.6 its vertical movement is limited or prevented by the engagement of the hook 8.

As a result of the final fixing being effected by the pressure exerted by the hook 8 in the Z direction, the positioning and repetition accuracies are improved because, other than with known clamping systems, the final compressive force does not depend on manually applied forces. The hook merely is turned until its final stop to obtain clearly reproducible forces.

Figure 5:
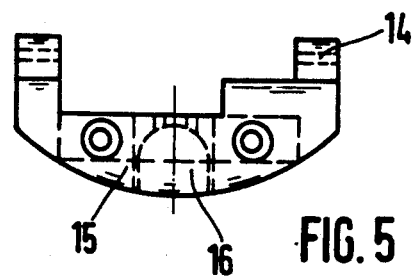
FIG. 5 is a top plan view of the thrust bearing for the interlocking means.

One end of the pin 12 of hook 8 has a hollow portion which is concentric with the pin 12 and adapted to be engaged by a tool to change the position of the hook 8. In this manner the hook 8 can be moved into its closing or opening position. The locking effect of the hook 8 can be reinforced by means of a thrust bearing 15 shown in FIG. 5. The outline of the thrust bearing 15 is C-shaped and it is arranged at the outside wall of the coupling member 2 by means of pins passed through bores 14 in the ends. With the hook 8 in closing position, its upper end face forms a flush border with the projection 16 of the thrust bearing 15.

However, if the hook 8 is moved into its open position its end face no longer is flush with the projection 16 of the thrust bearing; the intermediate piece 6 once more can be moved vertically.

Figures 6, 7:
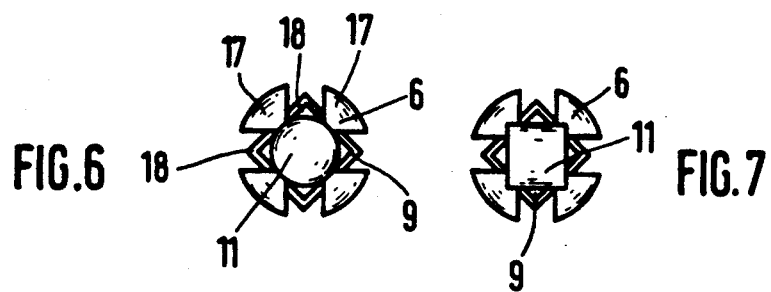
FIG. 6 is a sectional view of the one-piece bushing upon pressing on to a cylindrical shaft portion.
FIG. 7 is a sectional view of the one-piece bushing upon pressing on to a square shaft portion.

FIGS. 6 and 7 finally show how the one-piece bushing 9 may be arranged within the intermediate piece 6 so as to take up not only cylindrical shanks but also differently shaped shanks 11 of the tool 10. Moreover, FIG. 6 illustrates that the bushing may consist of a plurality of segments 17 which are connected to one another by resilient intermediate parts 18. As the entire bushing is made of resilient material it may be made in one piece also when given this configuration. The resilient elements 18 shown to be angular in FIG. 6 may be replaced by grooves extending in axial direction or by cuts which pass totally through the "flesh" of the bushing 6. These cuts, however, do not extend throughout the full axial length of the bushing so that preferably a closed ring remains at the one end of the bushing. Even a bushing of such configuration, therefore, still may be made in one piece.

What is claimed is:

1. A device for fastening an article to a machine tool comprising:
   a coupling member comprising a take-up sleeve formed with a bore;
   a single intermediate piece consisting of a hollow cylindrical shaft portion, which extends in the bore of the coupling member and a fixing portion, which projects laterally from the outside of the hollow cylindrical shaft portion;
   interlocking means, arranged at the front end of the take-up sleeve of the coupling member, or engaging the fixing portion; and
   a one-piece bushing, adapted to receive a shank of the article and having a conical outer surface, the outer surface providing a close fit, at least in part, with the inner surface of the hollow end of the cylindrical shaft portion.

2. A device as claimed in claim 1, wherein the article is a tool.

3. A device as claimed in claim 2, wherein the fixing portion of the single intermediate piece has a curved surface at its side facing the coupling member.

4. A device as claimed in claim 2, wherein the fixing portion of the single intermediate piece is angular in cross section.

5. A device as claimed in claim 3 or 4, wherein a groove is formed in the end face of the wall of the take-up sleeve of the coupling member to receive the respective fixing portion in line contact or narrow surface area contact.

6. A device as claimed in claim 5, wherein the end face of the take-up sleeve is formed as a stop on pushing-in the intermediate piece, and the groove is located offset with respect to the end face such that, on pushing in the single intermediate piece, the fixing portion first contacts the sidewalls of the groove and only then, upon further pushing in, enters into contact with the end face by becoming deformed elastically.

7. A device as claimed in claim 6, wherein the interlocking means is adapted to be rotated or turned and the fixing portion is adapted to be engaged with the interlocking means only upon being received in the groove.

8. A device as claimed in claim 7, wherein the interlocking means is a hook.

9. A device as claimed in claim 8, wherein the interlocking means is retained in a thrust bearing secured to the take-up sleeve.

10. A device as claimed in claim 8, wherein the one-piece bushing has a central circular opening in its bottom part, the diameter of said central circular opening being smaller than the diameter of the smallest cylinder which is defined by the inner surfaces of the walls and the axis of which is coaxially aligned with the axis of the one-piece bushing.

11. A device as claimed in claim 10, wherein the outer surface of the one-piece busing at least in part is of conical outline and the inner surfaces of the wall define an inner space adapted to receive and be clamped to the end of a cylindrical shank of the tool which is adapted to be pressed together with the one-piece bushing into the inner end of the shaft portion.

12. A device as claimed in claim 10, wherein the inner space in the one-piece bushing is of cylindrical shape.

13. A device as claimed in claim 10, wherein the inner space in the one-piece bushing has a shape which differs from the cylindrical shape.

14. A device as claimed in claim 12, wherein the bore formed in the shaft portion is conical in the range of the one-piece bushing.

15. A device as claimed in claim 14, wherein the outer surface of the one-piece bushing includes radially projecting fins.

16. A device as claimed in one of claims 10 to 13, wherein the inner surfaces of the wall include fins.

17. A device as claimed in claim 10, wherein the one-piece bushing is made of elastically deformable material.

18. A device as claimed in claim 14, wherein the one-piece bushing is made of aluminum.

19. A device as claimed in one of claims 10 to 13, wherein the one-piece bushing comprises a plurality of conical segments which are connected to one another by resilient parts.

20. A device as claimed in one of claims 10 to 13, wherein the one-piece bushing is embodied by a ring formed with cuts or slits which extend parallel to its central axis.

21. A device as claimed in one of claims 10 to 13, wherein the cross section of the bushing has a configuration which differs from a circular outline, especially a polygonal shape or the form of a polygonal course.

22. A device as claimed in claim 1 wherein the machine tool is a die sinking electric discharge machine.

23. A device as claimed in claim 2 wherein the tool is a spark erosion sinker electrode.

* * * * *